United States Patent [19]

Perry

[11] 3,710,100
[45] Jan. 9, 1973

[54] VEHICLE MOVEMENT CONTROL AND DETECTION METHOD AND APPARATUS

[75] Inventor: Robert H. Perry, Monroeville, Pa.

[73] Assignee: Westinghouse Electric Corporation, Pittsburgh, Pa.

[22] Filed: Dec. 24, 1970

[21] Appl. No.: 101,333

[52] U.S. Cl. ............. 246/28 R, 246/63 C, 246/187 B
[51] Int. Cl. ............................................. B61l 21/10
[58] Field of Search ...... 246/187 B, 34 R, 63 C, 28 R

[56] References Cited

UNITED STATES PATENTS

| | | | |
|---|---|---|---|
| 3,227,870 | 1/1966 | Joyce | 246/187 B |
| 3,202,816 | 8/1965 | Gregg | 246/63 C |
| 3,045,112 | 7/1962 | Hailes | 246/63 C |
| 3,218,453 | 11/1965 | Bingham | 246/34 R |
| 3,626,177 | 12/1971 | Franke | 246/1 R |
| 3,041,448 | 6/1962 | Pascoe et al. | 246/187 B X |

Primary Examiner—Gerald M. Forlenza
Assistant Examiner—George H. Libman
Attorney—F. H. Henson and R. G. Brodahl

[57] ABSTRACT

A vehicle movement control and detection system is divided into a plurality of vehicle control blocks, and the movement of a vehicle within a given vehicle control block is controlled by a vehicle control signal generated in the given vehicle control block. A signal receiver in the given vehicle control block senses the presence of a vehicle and a storage device stores a vehicle presence signal in response to the signal receiver sensing the vehicle presence. The storage device continues to store the vehicle presence signal until the vehicle has checked into the following vehicle control block. The generation of the vehicle control signal is prevented in the event the signal receiver no longer senses the vehicle's presence, or the storage device no longer stores the vehicle presence signal, during the time the vehicle is within the given vehicle control block, or in the event another vehicle is present in the succeeding vehicle control block.

10 Claims, 4 Drawing Figures

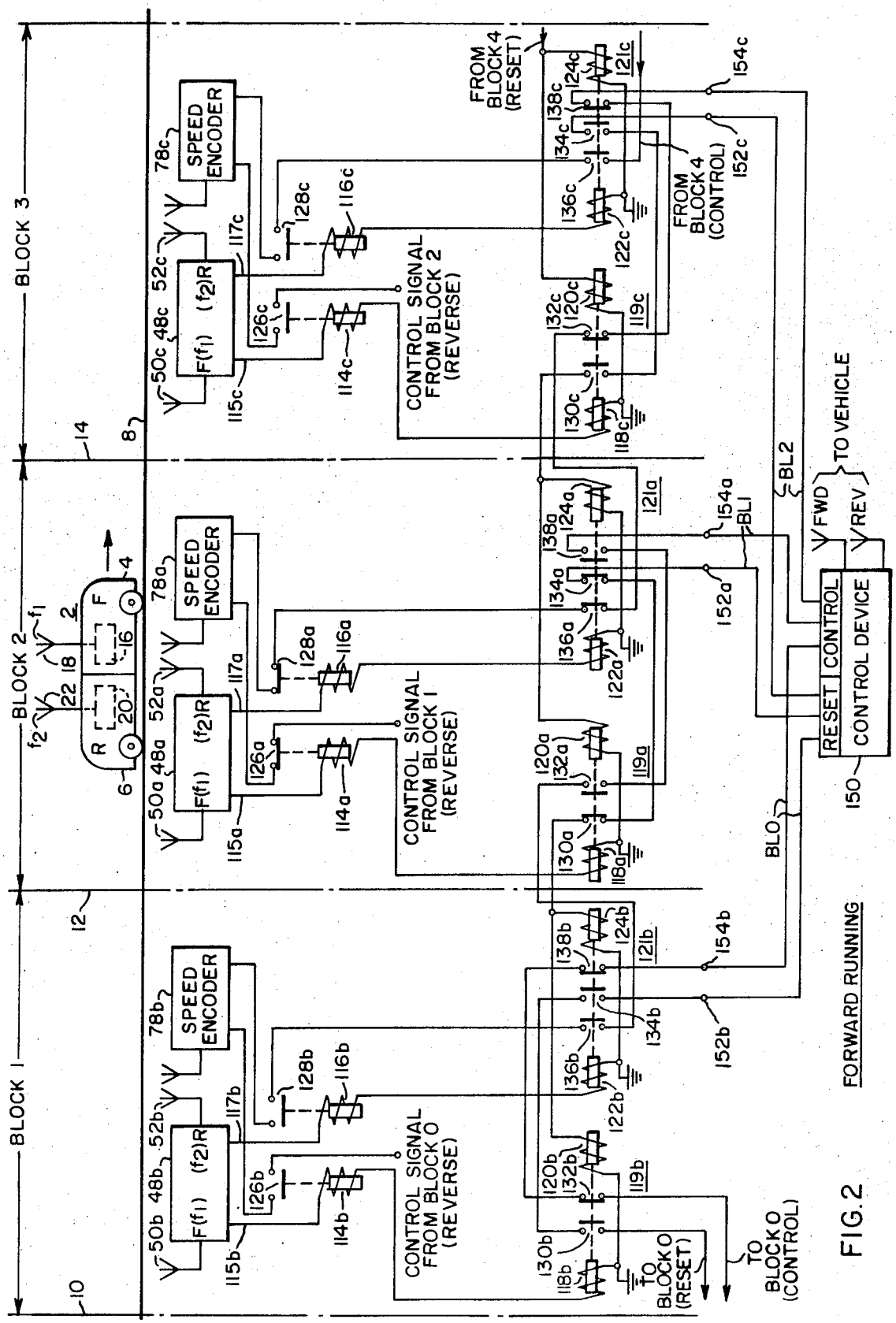
FIG.2  FORWARD RUNNING

VEHICLE MOVEMENT CONTROL AND DETECTION METHOD AND APPARATUS

BACKGROUND OF THE INVENTION

Generally, prior art vehicle control and detection systems utilized the steel wheels of a vehicle to short circuit steel rails in which signals were introduced, and thereby detected the presence of the vehicle. This was a relatively simple control and detection operation wherein signals are introduced from a signal source into the steel rails at one end of a given vehicle control block and are sensed by a signal receiver at the other end of that same vehicle control block. If a vehicle is not present within a given vehicle control block, the signals introduced at the one end of the vehicle control block, are sensed by the receiver located at the other end of the vehicle control block.

In the event a vehicle is within the given vehicle control block, the steel wheels of the vehicle short circuit the signal in the steel rails, and the receiver located at the other end of the vehicle control block is therefore unable to sense the signal, thus indicating the given vehicle control block is occupied.

This type of vehicle control and detection system has a number of failsafe features in that a failure of the signal source, the signal receiver, track breakage, or any other of a number of failures result in the signal transmitted from the signal source not being received by the signal receiver. This is indicative of a vehicle control block being occupied, which is a safe operational condition as no vehicle is allowed to enter the vehicle control block under these conditions.

With the advent of transportation systems including rubber tired vehicles, another failsafe type system must be devised for determining the presence of a vehicle within a given vehicle control block, as well as devising a method to control the movement of the vehicle. Known prior art vehicle control and detection systems utilize a signal transmission from a vehicle to a wayside receiver situated in the vehicle control block to generate a signal indicating that the vehicle control block is presently occupied by a vehicle. This is less of a failsafe vehicle control and detection system, since the failure of the transmitter on board the vehicle; failure of the signal receiver at the wayside; or the failure of transmitting or receiving antennas, or any of a number of system failures indicate that the vehicle control block is unoccupied as the signal receiver no longer receives the signal transmitted by the vehicle. This is obviously an unsafe condition as it results in an indication of the vehicle control block being unoccupied, when in fact the vehicle control block is occupied by a vehicle. In such a situation, a following vehicle would be permitted to enter the occupied vehicle control block resulting in a collision of the two vehicles which may result in derailment of one or both vehicles and possible injury to, or loss of life of persons on board the two vehicles.

The teachings of the present invention utilize a signal transmission from a vehicle in conjunction with a signal storage device located at the wayside of a vehicle control block to indicate vehicle presence within the vehicle control block. In the event the signal transmitter on board the vehicle fails or the signal receiver at the wayside fails, the storage device continues to store a signal indicative of a vehicle being present in the vehicle control block, which is a safe mode of operation.

SUMMARY OF THE INVENTION

The present vehicle control and detection method and apparatus is a system divided into a plurality of vehicle control blocks, and the movement of a vehicle through a given control block is controlled by a vehicle control signal generated within the given vehicle control block. In each vehicle control block there is a device for sensing the presence of a vehicle within the block. A storage device stores a vehicle presence signal in response to the sensing of the presence of the vehicle with the given vehicle control block, and the vehicle presence signal is stored until the vehicle checks into the following vehicle control block. During the time the vehicle presence signal is stored, a control signal is transmitted to the preceeding vehicle control block to prevent the generation of a vehicle speed control signal within the preceeding vehicle control block. The generation of a vehicle speed control signal in a given vehicle control block is prevented in the event the device for sensing the vehicle presence no longer does so, or the storage device no longer stores the vehicle presence signal, during the time the vehicle is within the given vehicle control block or the succeeding vehicle control block is occupied by a vehicle. The devices utilized in a vehicle control block, may include either solid state or relay type devices.

DESCRIPTION OF THE DRAWINGS

FIG. 2 is a system block diagram embodying the teachings of the present invention for detecting and controlling the movement of a vehicle in a forward direction;

DETAILED DESCRIPTION OF THE PREFERRED EMBODIMENT

Figure 1A:
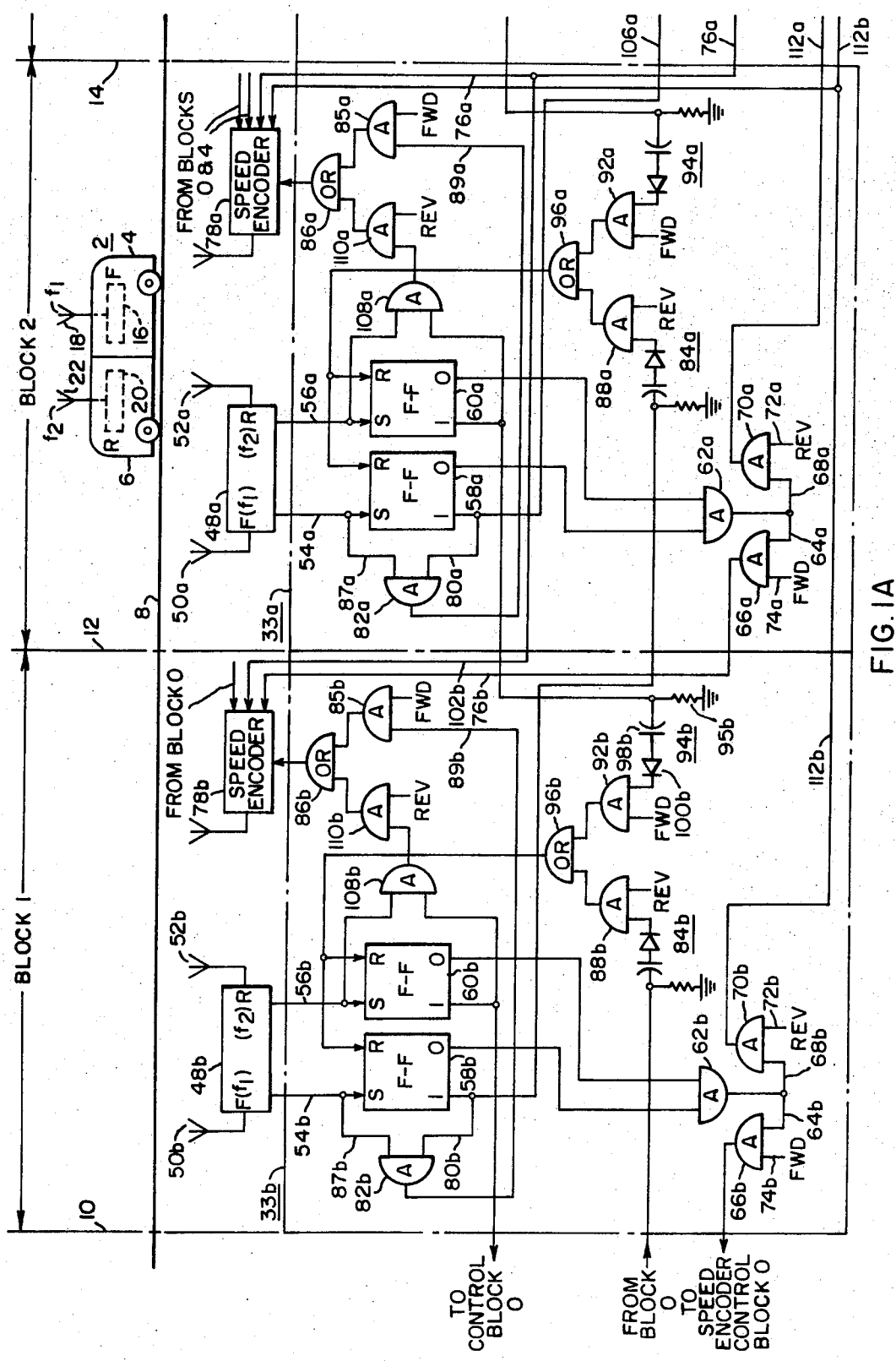
FIGS. 1A and 1B form a system block diagram embodying the teachings of the present invention for detecting and controlling the movement of a vehicle in either a forward or reverse direction.
Figure 1B:
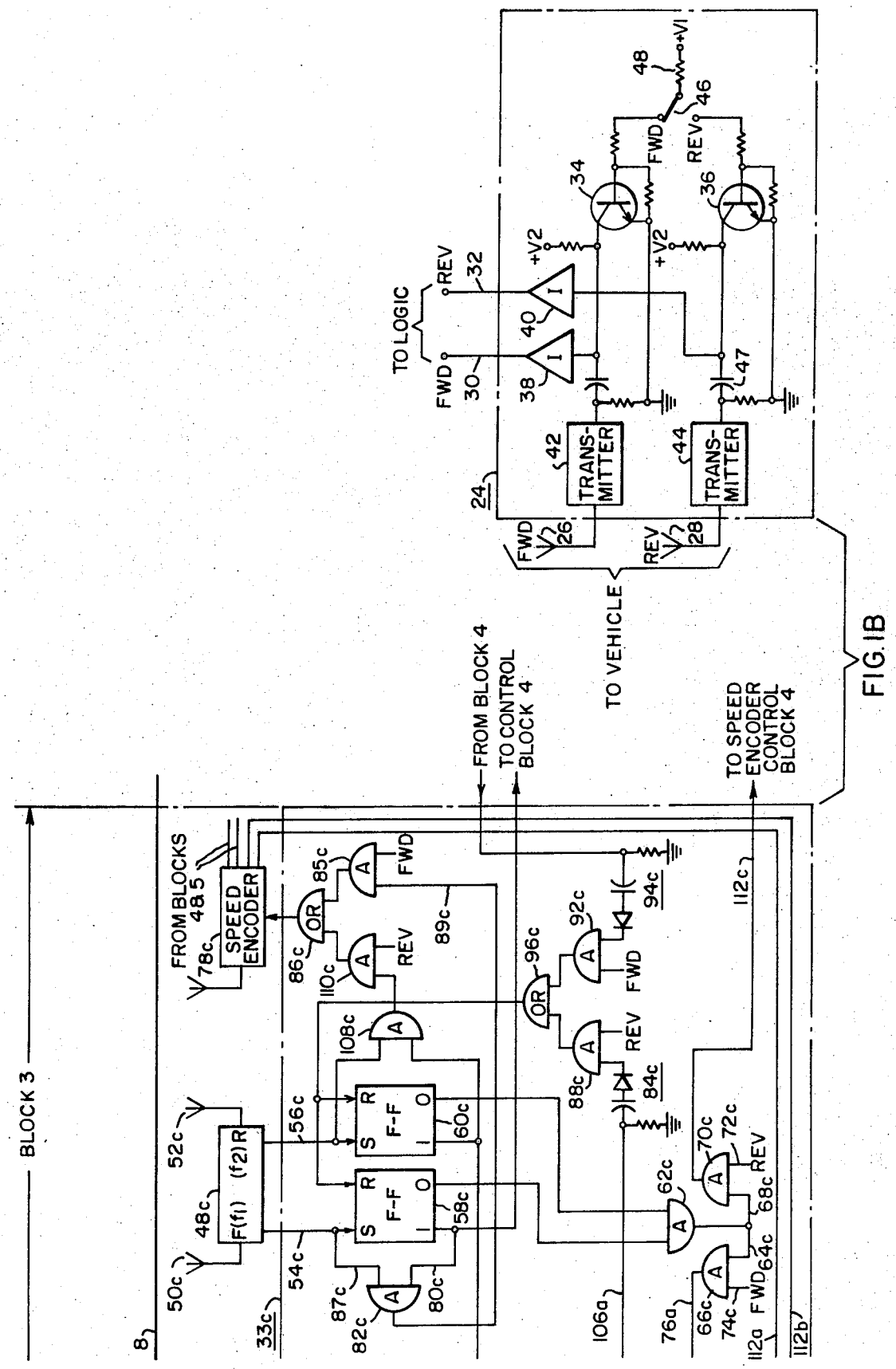

In reference to the block diagrams of FIGS. 1A and 1B there is shown, when the drawings are placed end to end, a vehicle detection and control system in which a vehicle 2 (as shown in FIG. 1A) includes a front vehicle car 4 and a rear vehicle car 6. The vehicle 2 may travel from left to right or alternatively from right to left over a vehicle path 8 which is divided into a plurality of vehicle control blocks which are illustrated as block 1, block 2 as shown in FIG. 1A of the drawings and block 3 as shown in FIG. 1B of the drawings. The division line between block 0 (not shown) and block 1 is schematically illustrated by the line 10, the division line between vehicle control block 1 and vehicle control block 2 is indicated schematically by the line 12, and the division line between vehicle control block 2 and vehicle control block 3 is indicated schematically by the line 14. The front vehicle car 4 (as shown in FIG. 1A) includes a radio frequency transmitter 16 which transmits a signal at a frequency $f1$ over an antenna 18. The rear vehicle car 6 includes a radio frequency transmitter 20 which transmits a radio signal at a frequency $f2$ which is a frequency different than the frequency $f1$, and the signals at frequency $f2$ are transmitted over an antenna 22.

The movement of the vehicle 2 in a direction from left to right (as shown from FIG. 1A to FIG. 1B) is considered a forward movement of the vehicle and the movement of the vehicle from right to left is considered a reverse movement of the vehicle. The direction of travel of the vehicle may be controlled by a switch contained in the vehicle, or the vehicle's direction of travel may be controlled by a remote control device such as the control device 24 shown in FIG. 1B. A signal is transmitted via the antenna 26 to the vehicle if the vehicle is to travel in the forward direction and a signal is transmitted via the antenna 28 if the vehicle is to travel in the reverse direction. The control device 24 also sends a forward command digital signal via the line 30 to the vehicle control and detection logic circuit 33 contained in FIGS. 1A and 1B, and a reverse command digital signal is transmitted via the line 32 to the vehicle control and detection logic circuits of FIGS. 1A and 1B. The function of these signals is explained in detail later in the specification.

Refer briefly to the schematic illustration of the control device 24 in FIG. 1B which is one of many control devices suitable for use in the practice of the present invention. The control device 24 includes NPN transistors 34 and 36 as well as inverting devices 38 and 40, and standard signal transmitters 42 and 44. Consider that the system is to operate such that the vehicle illustrated in FIG. 1A is to travel in a left to right direction, that is, the vehicle is to travel in a forward direction, from FIG. 1A to FIG. 1B. A switch 46 in the control device 24 is switched to a forward position. A positive DC signal +V1 is provided to the base electrode of the transistor 34 through resistors 48 and 50 respectively. The +V1 signal is of sufficient positive magnitude to make the transistor 34 conductive, whereby the collector electrode of the transistor 34 is held substantially at ground potential. The ground or 0 volt potential at the collector electrode of the transistor 34 is applied to the input terminal of the inverting device 38 and a signal of positive potential +V (a binary 1 level) is provided at the output terminal of the inverter 38 and this positive potential, which is a signal indicative of forward movement of the vehicle is provided as an enabling signal to various logic elements in FIG. 1. The 0 volt signal enables transmitter 42 to transmit a forward command to the vehicle by way of the antenna 26. Since the switch 46 is applying positive potential to the base electrode of the transistor 34 there is a 0 volt level applied to the base electrode of the transistor 36. The base and emitter electrodes of transistor 36 therefore are essentially at the same potential, namely 0 volts, and the transistor 36, therefore, is nonconductive. The collector electrode of transistor 36 is substantially at a potential +V2, as transistor 36 is nonconductive. This positive potential +V2 is applied to the input terminal of the inverting device 40 and an output signal of zero volts is produced at the output terminal 32 of the device. This zero volt signal (a binary 0 level) is indicative of the vehicle not being commanded to travel in the reverse direction, and this signal is provided as a disabling signal to various logic elements in FIGS. 1A and 1B. The positive potential +V2 is coupled by way of a capacitor 47 to the input terminal of signal transmitter 44. This positive signal causes the signal transmitter 44 to become inoperative, and accordingly no reverse command signal is transmitted to the vehicle.

In reference to FIGS. 1A and 1B, each vehicle control block contains the same type logical elements. Therefore the operation of vehicle control block 2 is to be explained in detail, and it is to be understood that vehicle control blocks 1 and 3 operate in a similar manner. FIGS. 1A and 1B may be placed end to end to more readily envision the system operation. Elements in vehicle control block 2 have the letter a appended to their numeral designation, like logical elements in vehicle block 1 have the letter $b$ appended, and like logical elements in vehicle block 3 have the letter $c$ appended. Assume initially that there is no vehicle present in either vehicle control block 1, vehicle control block 2 or vehicle control block 3. All of the bistable devices 58 and 60, therefore, are in a reset state. In vehicle control block 2 as shown in FIG. 1A, the signal receiving apparatus 48a is therefore not sensing the transmission of either a signal at a frequency $f1$ from the front vehicle car 4 of the vehicle 2 or a radio signal transmission at frequency $f2$ from the rear vehicle car 6 of the vehicle 2. The radio frequency signal receiver 48a may be any of a number of radio signal frequency receivers known in the art, and therefore need not be described in detail. The radio receiver 48a senses the radio signal transmission at frequency $f1$ through an antenna 50a and senses the transmission of the radio signal at a frequency $f2$ through an antenna 52a. In practice the antennas 50a and 52a extend along the roadway for the length of the vehicle control block 2, that is, the antennas 50a and 52a would essentially extend from the dividing line 12 to the dividing line 14. The antennas in vehicle control blocks 1 and 3 would extend along the roadway in like manner, in the respective vehicle control blocks which they are operative with.

Since the receiver 48a is not sensing radio signal transmissions there are no signal indications produced on the output lines 54a and 56a respectively, and the storage or bistable devices such as the set and reset flip-flops 58a and 60a remain in a reset condition. The one output terminals of the flip-flops 58a and 60a therefore are at a binary zero level and the zero output terminals of the flip-flops are at a binary one level. The zero output terminals of the flip-flops 58a and 60a are coupled to the input terminals of an AND gate 62a. This enables the AND gate 62a to provide a signal at a binary one level to the first input terminal 64a of an AND gate 66a and also to the first input terminal 68a of an AND gate 70a. The second input terminal 72a of the AND gate 70a receives the reverse command signal from the control device 24, and since the control device 24, as explained above, is set in a forward running condition the signal applied to the second input terminal 72a is at a binary zero level and, therefore, the output signal from the AND gate 70a also is at a binary zero level. The second input terminal 74a of the AND gate 66 $a$ receives the forward running command signal from the control device 24 and this signal is at a binary one level at this time. Since both input terminals of the AND gate 66a are at a binary one level at this time a signal at a binary one level is produced at the output terminal of the AND gate 66a and is coupled via line 76b to a speed encoder 78b in vehicle control block 1. This signal which is at a binary one level, is indicative of there being no vehicle present in vehicle control block 2. The speed encoder 78b in vehicle control block 1 therefore may generate a speed control signal for vehicles within vehicle control block 1. Since there is no vehicle present in vehicle control blocks 1 and 3 at this time, gate 66b in logic circuit 33b is providing a binary 1 signal to the speed encoder in vehicle control block 0 (not shown) so that speed encoder may generate a speed command for a vehicle in vehicle control block 0. Gate 66c is providing a binary 1 signal on line 76a to speed encoder 78a in block 2 and a binary 1 signal on line 102b to speed encoder 78b in vehicle control block 1.

Consider now that a vehicle is in control block 1 and is beginning to enter vehicle control block 2. As the front vehicle car 4 passes the dividing line 12 between vehicle block 1 and vehicle block 2 the radio frequency transmissions from the antenna 18 are received by the antenna 50a of the radio frequency receiver 48a and a signal at a binary one level is produced on the line 54a setting the flip-flop 58a to the binary one state. Flip-flop 58a now stores a first vehicle presence signal at this time. Flip-flops 58b and 60b in vehicle control block 1 are in a binary 1 or set state at this time as they are each storing a vehicle presence signal, and will continue to do so until the vehicle 2 is completely within vehicle control block 2, and completely without vehicle control block 1. This is to be made more clear shortly. A signal at a binary one level is produced at the one output terminal of the flip-flop 58a and is coupled to a first input 80a of an AND gate 82a and is also coupled via a line 106a to a differentiating and detecting network 84c and in turn to a first input 86c of an AND gate 88c in logic circuit 33c of vehicle control block 3 (FIG. 1B). The gate 88c is also receiving a reverse command at this time and is therefore disabled. The zero output terminal of the flip-flop 58a is now at a binary zero level which in turn causes the AND gate 62a to produce a signal at a binary zero level at its output, and the output terminal of the AND gate 66a in turn produces a signal at a binary zero level. This binary zero signal which is coupled via the line 76b to the speed encoder 78b, informs vehicle control block 1 that vehicle control block 2 is now occupied and the speed encoder 78b in vehicle control block 1 ceases to transmit control signals to any vehicle entering vehicle control block 1, as it is disabled by the binary 0 signal. Any vehicle thereafter entering vehicle control block 1 while there is a signal indicative of a binary zero level present on the line 76b is given a zero speed command signal which causes the vehicle to stop. The vehicle stopping is therefore not permitted to proceed any further in vehicle block 1 or to enter vehicle control block 2. The vehicle entering vehicle block 1 is not given a vehicle speed command signal until both the flip-flops 58a and 60a in vehicle control block 2 are concurrently in the reset state, as is to be explained shortly.

As the vehicle 2 continues from vehicle control block 1 into vehicle control block 2 the rear vehicle car 6 subsequently enters vehicle control block 2, and the receiving antenna 52a of receiver 48a receives the radio frequency signal transmissions at frequency $f2$ from the antenna 22 mounted on the rear vehicle car 6.

A signal at a binary one level is produced on the line 56a and in response thereto the flip-flop 60a is set to the binary one state. The signal from the one output terminal of flip-flop 60a, which is now at a binary one level is coupled to a first input 90b of an AND gate 92b by way of a differentiating and detecting network 94b in logic circuit 33b in vehicle control block 1. The differentiating network 94b includes a resistor 95b, a capacitor 98b and a diode 100b. The time constant of the differentiating network is such that in response to the leading edge of the binary one pulse produced at the one output terminal of the flip-flop 60a, a positive pulse is produced by the network 94b which is coupled via the diode 100b to the first input terminal of the AND gate 92b. Since the second input terminal of the AND gate 92b is receiving a forward running signal, which is also at a binary one level at this time, a binary one signal is produced at the output terminal of the AND gate 92b and is provided to a first input terminal of an OR gate 96b. The output terminal of the OR gate 96b produces a pulse at a binary one level in response to the binary one signal at the input terminal and this signal is concurrently applied to the reset terminals of the flip-flops 58b and 60b in vehicle control block 1. This signal resets the flip-flops 58b and 60b and is indicative of the vehicle which was in vehicle control block 1 as now being completely within vehicle control block 2 since the flip-flop 60a in vehicle control block 2 is set to the binary one state in response to the rear vehicle car 6 of the vehicle 2 entering vehicle control block 2.

The differentiating and detection network 94b is needed since the flip-flop 60b in vehicle control block 2 remains in the one state until it is reset in response to the rear vehicle car 6 of the vehicle 2 entering vehicle control block 3. If a vehicle were to now enter vehicle control block 1, the flip-flops 58b and 60b in vehicle control block 1 would be successively set to the binary one state. However, if the differentiating network 94b were not present the flip-flops 58b and 60b after being set to the one state would be responsive to the binary one pulse still present at the one output terminal of the flip-flop 60a in vehicle control block 2, and so being responsive could be reset to the binary zero state which would be an indication that vehicle control block 1 were in an unoccupied condition which is not the case.

Since there is no vehicle present in vehicle control block 3 at this time a signal at a binary 1 level is present on line 76a and speed encoder 78a therefore is permitted to transmit a vehicle speed command to the vehicle 2 such that the vehicle 2 may continue on its path of travel through vehicle control block 2, and subsequently into vehicle control block 3.

If there is a failure of radio frequency transmission from the vehicle 2, or a failure in the receiver 48a, or if the flip-flop 58a fails to continue the storage of the binary 1 vehicle presence signal which is indicative of the front of the vehicle being present in the vehicle block 2, there must be a means for preventing the generation of a vehicle speed command by the speed encoder 78a for transmission to the vehicle 2. This is accomplished by means of the AND gates 82a and 85a and the OR gate 86a. A first input to the AND gate 82a is from the output terminal of receiver 48a via the line 87a. A binary one signal is present there as long as the receiver 48a is receiving a signal at frequency $f1$ from the front vehicle car 4, and the receiver 48a is producing an output signal. The second input terminal 80a of the AND gate 82a is connected to the one output terminal of the flip-flop 58a. A binary one signal is produced at this terminal as long as the flip-flop 58a is in the set state, which is indicative of 58a storing a vehicle presence signal. The AND gate 82a produces a signal at a binary one level at its output only so long as there is a binary one signal produced by the receiver 48a and concurrent therewith the flip-flop 58 is in the binary one state. This binary one signal which is produced at the output terminal of the AND gate 82a is applied to a first input 89a of the AND gate 85a. The second input signal applied to AND gate 85a is the forward running command from the control device 24, which is at a binary one level at this time. The AND gate 85a therefore produces a signal at a binary one level at its output terminal and this signal is provided to a first input terminal of the OR gate 86a which in turn produces a binary one signal at its output terminal. As long as there is a binary one signal produced at the output terminal of the OR gate 86a the speed encoder 78a is permitted to provide a vehicle speed control signal, for vehicle control block 2 if there is also provided a binary one signal on the line 76a from AND gate 66c. However, if there is a failure in transmission from the vehicle, or a failure in the receiver 48a or a failure of the flip-flop 58a to continue the storage of a binary one signal while the vehicle is present in the vehicle control block 2, or there is a failure of a gate 82a, 85a or 86a, a binary zero signal is provided at the output terminal of the OR gate 86a to the speed encoder 78a and a zero speed command signal is transmitted to the vehicle, stopping the vehicle in vehicle control block 2.

As the vehicle 2 enters vehicle control block 3 (as shown in FIG. 1B) the receiver 48c begins to receive the radio frequency transmission at frequency $f1$ and the flip-flop 58c in turn is set to the binary one state, storing a vehicle presence signal. A signal at a binary zero level is produced at the zero output terminal of the flip-flop 58C which disables the AND gate 62c and in turn disables the AND gate 66c producing a signal at a binary zero level on the line 76a which prevents the speed encoder 78a in vehicle control block 2 from generating vehicle speed commands. The momentum of the vehicle 2 is sufficient to permit it to continue into block 3 a distance far enough for it to begin to receive vehicle speed commands from the speed encoder 78c in vehicle control block 3. The flip-flops 58a and 60a in vehicle control block 2 are still in the set state which is a block occupied condition for vehicle control block 2. These last-named flip-flops remain in the set state until the rear vehicle car 6 of the vehicle 2 is entered into vehicle control block 3.

Consider now that the rear vehicle car 6 of vehicle 2 is now entering vehicle control block 3. Radio signal receiver 48c receives the radio frequency signal transmission at frequency $f2$ and in response thereto a binary one signal is produced on the line 56c setting the flip-flop 60c to the binary one state. The binary one signal produced at the one output terminal of flip-flop 60c is coupled to the differentiating network 94a in vehicle control block 2 (as shown in FIG. 1A) and in turn to the first input terminal of the AND gate 92a.

The second input terminal of the AND gate 92a is receiving the forward running control signal from control device 24, which is at a binary one level at this time. The AND gate 92a therefore produces a binary one signal at its output terminal which is coupled to the first input terminal of the OR gate 96a which in turn produces a binary one signal at its output and in turn the binary one signal at the output terminal of the OR gate 96a resets the flip-flops 58a and 60a to the binary zero state, so they are no longer storing vehicle presence signals. The resetting of these flip-flops is indicative that the vehicle 2 has left vehicle control block 2 and is now in vehicle control block 3. As was explained earlier there is also a binary zero level present on the line 76a which is indicative of at least the front vehicle car 4 of the vehicle 2 being present in vehicle control block 3. The speed encoder 78a in vehicle control block 2 therefore is prevented from transmitting a vehicle speed command to any vehicle which is entering vehicle control block 2 at this time. This is a safety measure which prevents a succeeding vehicle which is entering the vehicle control block 2 from continuing from vehicle control block 2 into vehicle control block 3 and thereby colliding with the vehicle 2 which is now in vehicle control block 3.

There may be more than one input to the speed encoder 78a than from the preceding vehicle control block. If the effective braking distance of the vehicle is one vehicle control block in length there need be only a control signal provided from the succeeding vehicle control block to the speed encoder. If, however, the vehicle has an effective braking distance of two vehicle control blocks in length a control signal would be coupled to the speed encoder from the two succeeding vehicle control blocks. For example, the speed encoder in vehicle control block 1 would receive control signals via the line 76b from vehicle control block 2 and would also receive a control signal from vehicle control block 3 via the line 102b, if the effective braking distance of the vehicle is two vehicle control blocks in length, and the vehicle is traveling in the forward direction. The operation of the system repeats itself as the vehicle 2 travels through succeeding vehicle control blocks.

Consider now the operation of the system when the vehicle 2 is given a reverse running control signal from the control device 24 (as shown in FIG. 1B). First assume that all vehicle control blocks are empty and therefore the flip-flops 58 and 60 in each of the vehicle control blocks are in the reset state at this time. Now consider that the vehicle 2 is running in the reverse direction from vehicle control block 3 and is entering vehicle control block 2. The flip-flops 58c and 60c (vehicle control block 3, FIG. 1B) would be in a set state at this time. The radio frequency receiver 48a begins to receive radio signals at frequency $f2$ from the rear vehicle car 6 of the vehicle 2 as it enters vehicle control block 2. In response to the radio frequency signals at frequency $f2$ the receiver 48a produces a binary one signal one the line 56a setting the flip-flop 60a to the binary one state. The flip-flop 60a now stores a vehicle presence signal. The binary one signal produced at the one output terminal of the flip-flop 60a is coupled to the first input terminal of the AND gate 92b in vehicle control block 1 by way of differentiating network 94b. However, the forward running control signal is at a binary zero level at this time and the output of the AND gate 92 therefore is at a binary zero level at this time and the flip-flops 58b and 60b do not receive a reset signal by this circuit at this time. Since the flip-flop 60a is in the binary one state at this time, a signal at a binary zero level is produced at the zero output terminal of the flip-flop 60a. This zero binary signal is coupled to the second input of the AND gate 62a disabling this gate and in turn disabling AND gate 70a which is receiving a binary one reverse running control signal at its other input terminal. This binary zero signal at the output terminal of the AND gate 70a is coupled via line 112a to the speed encoder 78c in vehicle control block 3 (as shown in FIG. 1B) causing the speed encoder 78c to no longer transmit vehicle speed control signals for any vehicle which is entering or within vehicle control block 3. As was explained before this prevents a vehicle which is entering vehicle control block 3 from vehicle control block 4 (not shown) from continuing through vehicle block 3 and colliding with the vehicle 2 in vehicle control block 2.

As the vehicle 2 continues into vehicle control block 2 the front vehicle car 4 subsequently enters vehicle control block 2 and the receiver 48a begins to receive the radio frequency transmission at frequency $f1$ and in turn produces a binary one signal on the line 54a thereby setting the flip-flop 58a to the binary one state. This in turn produces a binary one signal at the one output terminal of the flip-flop 58a. The flip-flop 58a now stores a vehicle presence signal. The vehicle 2 is now completely within the vehicle control block 2 and the binary one signal present at the one output terminal of the flip-flop 58a is coupled via a line 106a through differentiating and detecting network 84c, (as shown in FIG. 1B) to a first input terminal of the AND gate 88c, in vehicle control block 3. The second input terminal of the AND gate 88c is receiving a binary one signal as the reverse running command from the control device 24 is at a binary one level at this time. A binary one signal is produced at the output terminal of the AND gate 88c and is coupled through the OR gate 96c to the reset terminals of flip-flops 58c and 60c resetting these flip-flops. The flip-flops 58c and 60c are now no longer storing vehicle presence signals. The binary one signals produced at the zero output terminals of the flip-flops 58c and 60c are coupled to the inputs of the AND gate 62c producing a binary one pulse at the output terminal of the AND gate 62c. This binary one signal is coupled to the first input terminal of the AND gate 70C. The other input terminal of the AND gate 70c is receiving the binary one reverse running control signal and the AND gate produces a binary one signal at its output terminal which is provided to the speed encoder 78c in vehicle control block 4 (not shown) by way of line 112c for providing a control signal such that the speed encoder 78 in vehicle control block 4 may generate speed control signals for vehicles in or entering vehicle control block 4.

As was the case when the vehicle was running in the forward direction there must also be a means when the vehicle is traveling in the reverse direction for detecting when the receiver 48a no longer senses a transmission at radio frequency $f2$, or senses when there is a failure in the receiver 48a, or when the flip-flop 60a no longer stores a vehicle presence signal when the vehicle 2 is still within the vehicle control block 2. The AND gate 108a and the AND gate 110a perform the same functions as the AND gates 82a and 85a, respectively, did when the vehicle was traveling in the forward direction. The first input signal to the AND gate 108a is the binary one pulse produced on the line 56a from receiver 48a. The second input to the AND gate 108a is from the one output terminal of the flip-flop 60a. As long as there is a binary one signal produced on the output line 56a and the flip-flop 60a remains in the set state, a binary one signal is produced at the output terminal of the AND gate 108a. This signal is coupled to a first input of the AND gate 110a. The second input to the AND gate 110a is the reverse running control signal which is at a binary one level at this time. In response to these two signals, which are concurrently at a binary one level, a binary one signal is produced at the output terminal of the AND gate 110a and is coupled via the OR gate 86a to the speed encoder 78a informing the speed encoder 78a that it may continue to generate vehicle speed control signals for the vehicle 2 in vehicle control block 2. In the event there is a failure in transmission or reception of the radio frequency signal $f2$ while the vehicle is in vehicle control block 2 or the flip-flop 60a no longer stores a vehicle presence signal, or there is a failure of one of the gates 108a, 110a or 86a, a binary zero signal is produced at the output terminal of the OR gate 86a and the speed encoder 78a is prevented from generating vehicle speed control signals for the vehicle 2 while it is in vehicle control block 2.

As the vehicle 2 first enters vehicle control block 1 from vehicle control block 2 the receiver 48b in vehicle control block 1 begins to receive the radio frequency transmissions at frequency $f2$. A binary one signal is produced on the output line 56b in response thereto setting the flip-flop 60b to the binary one state, thereby storing a vehicle presence signal. Since the flip-flop 60b is now in the binary one state, a binary zero signal is produced at the zero output terminal of the flip-flop 60b. The AND gates 62b and 70b therefore are disabled and a signal at a binary zero level is produced at the output terminal of the AND gate 70b which in turn is provided to the speed encoder 78a in vehicle control block 2 causing the speed encoder 78a to no longer generate vehicle speed control signals for any vehicle entering vehicle control block 2, thereby preventing a vehicle from entering vehicle control block 1 from vehicle control block 2 as long as the vehicle 2 is in vehicle control block 1. As the front vehicle car 4 of vehicle 2 enters vehicle control block 1, receiver 48b begins to receive the radio frequency transmissions at frequency $f1$ and a binary one signal is produced on the line 54b and flip-flop 58b is set to the binary one state in response thereto, thereby storing a vehicle presence signal. The resulting binary one signal produced at the one output terminal of the flip-flop 58b is provided via differentiating and detecting circuit 84a to a first input terminal of AND gate 88a in vehicle control block 2. The second input terminal of the AND gate 88a receives the reverse running control signal which is at a binary one level at this time. As a result, a binary one signal is produced at the output terminal of the AND gate 88b and is coupled via OR gate 96a to the reset terminals of the flip-flops 58a and 60a concurrently resetting these flip-flops. The resulting binary one signals produced at the zero output terminals of the flip-flops 58a and 60a are coupled to the first and second input terminals, respectively, of the AND gates 62a producing a binary one signal at the output terminal of the AND gate 62a. This binary one signal is coupled to a first input terminal of the AND gate 70a and the second input terminal of the AND gate 70a is receiving a reverse running control signal which is at a binary one level at this time. The resultant binary one signal at the output terminal of the AND gate 70a is coupled via a line 110a to speed encoder 78c (vehicle control block 3, FIG. 1B). This binary one signal permits the speed encoder 78c to provide vehicle speed control signals for any vehicle in or entering vehicle control block 3, as vehicle control block 2 is now absent a vehicle. As the vehicle 2 proceeds in the reverse running direction from vehicle control block 1 into vehicle control block 0 (not shown) the operation of the vehicle control and detection system repeats itself.

Figure 3:
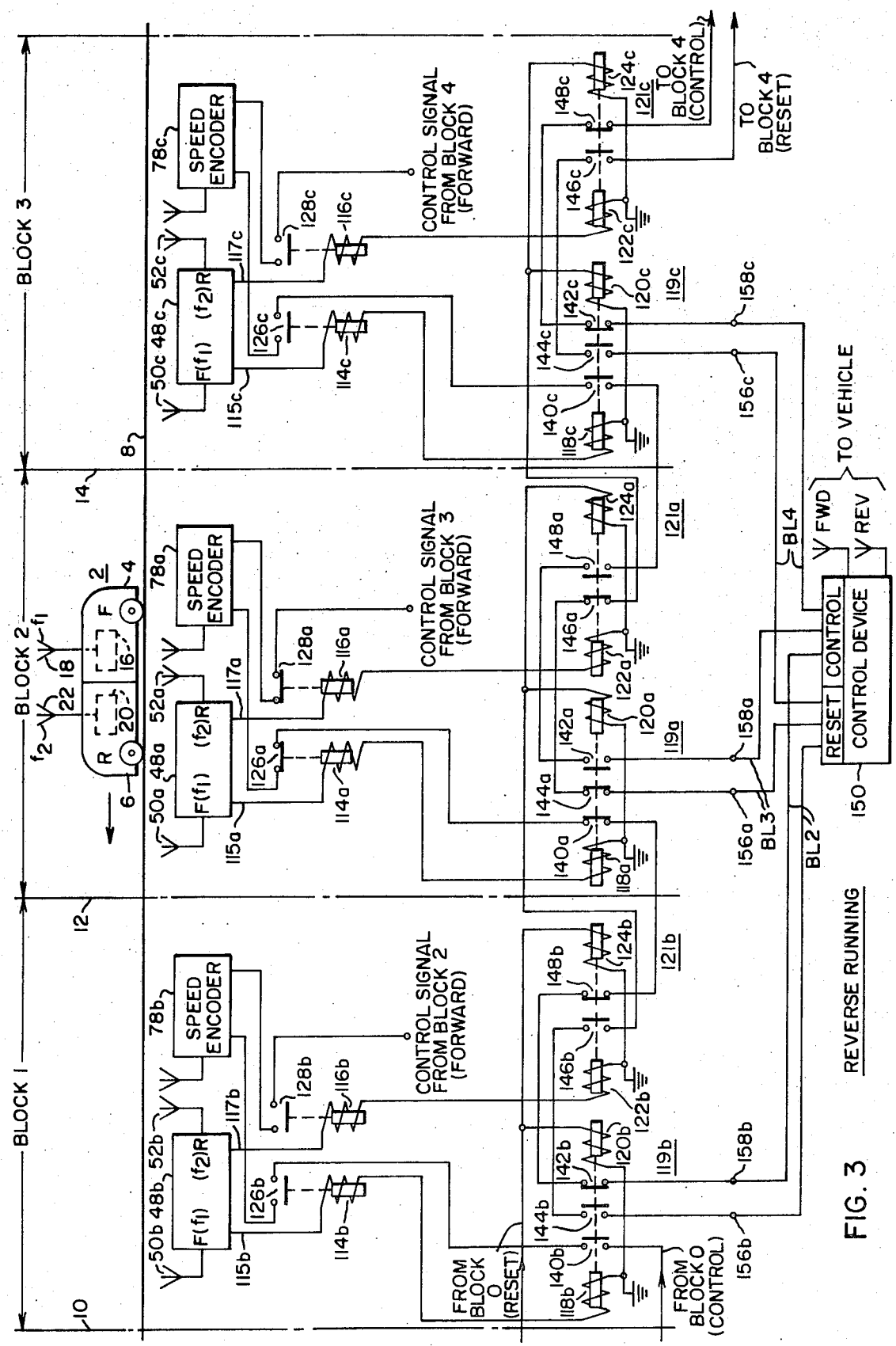
FIG. 3 is a system block diagram embodying the teachings of the present invention for detecting and controlling the movement of a vehicle in a reverse direction.

In reference to FIG. 2 there is shown a block diagram of a vehicle control and detection system for forward running of a vehicle utilizing relays rather than solid state logic devices. The vehicle 2 is identical to the vehicle 2 illustrated in FIG. 1A of the drawings as are the radio frequency signal receivers 48 and the speed encoders 78, illustrated in FIGS. 1A and 1B. The control device 150 shown in the lower portion of FIG. 2 performs the same function as the control device 24 in FIG. 1, that is, it informs the vehicle as to whether or not it is to travel in a forward or reverse direction and it applies reset signals to the terminals 152 of the relays and control signals to the terminals 154 of the relays when the vehicle is to travel in the forward direction. FIG. 3 of the drawings is explained in detail subsequently for the reverse running operation of the vehicle.

Assume that the vehicle 2 is completely within vehicle control block 2 and is traveling from left to right, the forward direction, as illustrated in FIG. 2. The relays in each of the vehicle control blocks illustrated have their relay contacts in the positions as illustrated, that is the relays in vehicle control block 2 are energized, and the relays in vehicle control blocks 1 and 3 are deenergized. The radio frequency receiver 48a is receiving a radio frequency signal at frequency $f1$ from the front vehicle car 4 and is receiving a radio frequency signal at frequency $f2$ from the rear vehicle car 6. A signal is applied, therefor, via the line 115a to the coil of a relay 114a energizing the relay. The relay's contacts 126a therefore assume the closed position shown. The relay 114a is a standard type relay that remains energized only so long as an energizing signal is applied to its input. The relay 116a is the same type relay as the relay 114a and it is energized by an energizing signal applied via the line 117a in response to the radio frequency signal at frequency $f2$, being sensed by receiver 48a. The coil of relay 114a is connected in series with the set coil 118 a of a bistable or biased relay 119a. Once the set coil 118a receives an energizing signal the relay contacts 130a and 132a assume the positions shown and remain in the positions shown after the energizing signal is removed. The positions of the contacts of the bistable relay 119a do not change until the reset coil 120a of the bistable relay 119a receives a reset energizing signal. When the set coil 118a becomes energized and the relay contacts assume the positions as shown the relay 119a is storing a vehicle presence signal, that is, the relay 119a being in the set state is indicative of the front vehicle car 4 of the train vehicle 2 being present in vehicle control block 2. The set coil 122a of the bistable relay 121a is connected in series with the coil of the relay 116a. The bistable relay 121a is the same type as the relay 119a. The energizing signal applied to the set coil 122a energizes the relay and the relay contacts 134a, 136a and 138a assume the positions shown. The energization of the set coil 122a is indicative of the storing of a vehicle presence signal which is indicative of the rear vehicle car 6 of the train vehicle 2 being present in vehicle control block 2. The positions of the contacts of bistable relay 121a remain in a position, as shown, until the reset coil 124a receives a reset signal.

Since the train vehicle 2 is situated within the vehicle control block 2 it is necessary that the speed encoder 78b in vehicle control block 1 not be permitted to transmit a vehicle speed control signal to a vehicle in or entering vehicle control block 1. The control signal for vehicle control block 1 is entered in vehicle control block 2 at the terminal 154a, and the signal is transmitted through the contacts 138a of bistable relay 121a which contacts are now open and through the contacts 132a of bistable relay 119a, which contacts also are open. Therefore, the control signal path for the encoder 78b is open. Continue the tracing of control signal path from vehicle control block 2 to vehicle control block 1. The relays 116b and 121b in vehicle control block 1 are each deenergized, as shown, since there is not a vehicle in vehicle control block 1. Therefore, following the control signal from vehicle block 2 it travels from the contacts 132a of the relay 119a to the contacts 136 b of the relay 121b and through the contacts 128b of the relay 116b to the speed encoder 78b. Though the last two mentioned sets of relay contacts are open as shown it is readily seen that even if a vehicle were completely within vehicle control block 1 and the relay 116b were energized and the set coil 122b had been energized and was thereby set such that the relay contacts 128b of the relay 116b and the relay contacts 136b of the relay 121b were closed there would still not be a complete circuit path for the control signal as the bistable relays 119a and 121a in vehicle control block 2 are each in the set condition thereby blocking the control signal's path from vehicle control block 2 to vehicle control block 1.

However, with the vehicle 2 being completely within the vehicle control block 2, vehicle control block 1 must be informed that the vehicle 2 is now completely without vehicle control block 1 and is completely within vehicle control block 2. The reset signal for vehicle control block 1 is applied from the control device 150 to the terminal 152a of the bistable relay 121a. The signal is transmitted through the closed relay contacts 134a of the last mentioned relay, through the closed contacts 130a of the bistable relay 119a and is applied to the reset coils 120b of the bistable relay 119b and the reset coil 124b of the bistable relay 121b. The respective bistable relays 119b and 121b therefore are in a reset or a block unoccupied condition at this time and are responsive to the presence of another vehicle entering vehicle control block 1. The bistable relays 119b and 121b are shown in the reset state at this time.

As vehicle 2 continues its travel through vehicle control block 2 and then begins to enter vehicle control block 3, the radio frequency receiver 48a in vehicle control lock 2 no longer senses the radio frequency transmissions at frequency f1 and relay 114a therefore becomes deenergized. Bistable relay 119a, however, remains in the set state until receiving a reset signal from vehicle control block 3 when the vehicle 2 is completely within vehicle control block 3. Radio frequency receiver 48c in vehicle control block 3 now begins to receive radio frequency transmissions at a frequency f1 from the front vehicle car 4 of the vehicle 2 and applies an energizing signal via the line 115c to the coil of the relay 114c energizing this relay. The contacts 126c therefore assume a closed position. The control signal from vehicle control block 2 for reverse running of a vehicle within vehicle control block 3 is applied to these contacts of the relay for application to the speed encoder 78c. The function of this signal is explained in regard to reverse running operation for FIG. 4. At this time there is no signal applied to the contacts 126c of this relay as the vehicle is running in the forward direction. The energizing signal is also applied to the set coil 118c of the bistable relay 119c thereby setting the bistable relay. The bistable relay 119c is now storing a first vehicle presence signal that is indicative of the first vehicle car 4 of the vehicle 2 being present within vehicle control block 3, and the bistable relay 119c remains in the set state until being reset by a reset signal from vehicle control block 4 (not shown) when the vehicle 2 is completely without vehicle block 3 and is completely within vehicle control block 4. The relay contacts 130c now switch to a closed position and the relay contacts 132c switch to an open position. The opening of the relay contacts 132c of the bistable relay 119c in vehicle control block 3 interrupts the application of the control signal for vehicle block 2 which is applied to the terminal 154c of the relay 121c. Therefore, the speed encoder 78a no longer receives a control signal and therefore no longer may generate a vehicle speed control signal for a vehicle entering vehicle block 2 as there is now a vehicle in vehicle control block 3. The closed contacts 130c of relay 119c form part of the path for the application of the reset signal to the reset coils 120a and 124a of the bistable relays 119a and 121a, respectively, in vehicle control block 2. The complete path for the reset signal is not closed however until the set coil 122c of relay 121c is energized when the second vehicle car 6 of vehicle 2 enters vehicle control block 3. As the second vehicle car 6 of the vehicle 2 enters vehicle control block 3, radio frequency receiver 48c begins to receive radio frequency transmissions at frequency f2 and applies an energizing signal via the line 117c to the coil of the relay 116c energizing the relay and closing the contacts 128c. The energizing signal is also applied to the set coil 122c of the bistable relay 121c, setting the bistable relay which now stores a second vehicle presence signal, which is indicative of the second vehicle car being present in vehicle control block 3. Relay contacts 134c and 136c now assume a closed position and relay contacts 138c assume an opened position. Since contacts 136c of relay 121c are closed at this time as are contacts 128c of the relay 116c there is a path for the control signal to be applied to the speed encoder 78c from vehicle control block 4 (not shown) such that the speed encoder 78c may transmit vehicle speed control signals to the vehicle 2. The closing of the relay contacts 134c of the relay 121c now provide a complete circuit path for the reset signal which is applied to terminal 152c of the relay 120c to reset the bistable relays 119a and 124a in vehicle control block 2. The reset signal is applied to the terminal 152c then through the closed relay contacts 134c of bistable relay 121c through the closed relay contacts 130c of the bistable relay 119c in vehicle control block 3, and from there to the reset coils 120a and 124a of the bistable relays 119a and 121a respectively, in vehicle control block 2. This informs vehicle control block 2 that the vehicle 2 is now completely within vehicle control block 3 and vehicle control block 2 is now in condition to permit another vehicle to enter. The travel of the vehicle 2 to succeeding blocks is accomplished in a similar manner to that which was explained above.

The relay embodiment of the invention shown has the same safety feature as the logic embodiment shown in FIGS. 1A and 1B that feature being that if the vehicle is within a given vehicle control block and there is a failure in transmission of the radio frequency signals to the receiver 48 or the receiver 48 in a given vehicle control block has some type of failure whereby it does not provide an energizing signal for the relays, or if there is some relay failure, the speed encoder is prevented from generating a vehicle control signal. This may readily be seen by referring to vehicle control block 2 and assuming that the vehicle 2 is within the vehicle control block as shown. The relay contacts therefore also will be in the positions as shown. The control signal which is applied to the speed encoder 78a is applied through the closed contacts 136a of the bistable relay 121a and the closed contacts 128a of the relay 116a. As was earlier mentioned the relay 116a remains energized and the contacts 128a therefore remain closed only so long as an energizing signal is applied to the relay 116a. It is seen therefore that if there is a failure in transmission of the radio frequency signal from the vehicle 2 or if there is a failure in the radio frequency receiver 48a or if the relay 116a itself fails, it follows that the relay 116a becomes deenergized, the contacts 128a open and the control signal is no longer applied to the speed encoder 78a and there are therefore no vehicle speed control signals generated. Although the bistable relay 121a remains in the set condition after an energizing signal is initially applied to the set coil, in the event that the relay fails in some manner and no longer stores a signal indicative of the vehicle being present in the vehicle control block 2 when the vehicle is in fact present in vehicle control block 2, the relay contacts 136a would be opened and again the path for the control signal to the speed encoder 78a would be opened and no vehicle speed control signals could be generated.

In reference to FIG. 3 there is shown the embodiment for the vehicle control and detection system utilizing relays, for reverse running of the vehicle 2. The relays are the identical relays as shown in FIG. 3 as is the control device 150, the only difference being that in FIG. 4 the relay contacts for reverse running are shown, and the contacts for forward running are not shown. The terminals 156 to which reset signals are applied for reverse running conditions from the control device 150 and the terminals 158 to which the control signals are applied for reverse running are shown, but the terminals 152 and 154 for forward running are not shown. If the vehicle is to travel in the reverse direction the control device 150 applies the reset and control signals to the terminals 156 and 158, respectively, and transmits a reverse direction of travel control signal to the vehicle.

Assume that the vehicle 2 is within the vehicle control block 2 as shown and is traveling in a reverse direction that is from right to left, as is illustrated by the arrow on the drawing. Since the vehicle 2 is completely within vehicle control block 2 as shown, the radio frequency receiver 48a is receiving radio frequency transmissions at both frequencies $f1$ and $f2$ and energizing signals are applied via the lines 115a and 117a to the relays 114a and 116a, respectively, energizing these relays, and in turn closing the contacts 126a and 128a, respectively, as shown. The set coils 118a and 122a of the bistable relays 119a and 121a, respectively, in turn receive the energizing signals and are set, thereby storing first and second vehicle presence signals, respectively, which are indicative of the vehicle 2 being completely within vehicle control block 2. Since vehicle control block 1 is absent a vehicle, as shown, the control signal for vehicle control block 2 which is applied to the speed encoder 78 a is first applied to the terminal 158b of bistable relay 119b which is in the reset condition at this time through the closed contacts 142b of bistable relay 119b and through the closed contacts 148b of the bistable relay 121b, which is in the reset condition at this time, and through the closed contacts 140a of bistable relay 119a which is in the set condition at this time, and through the closed contacts 126a of the energized relay 114a, and in turn to the speed encoder 78a. The speed encoder 78a then transmits vehicle speed control signals to the vehicle 2. The relay 116a has applied to its closed contacts 128a control signals from block 3 for forward running, there is however at this time no signal applied to these contacts as the control device 150 is only sending out signals for the reverse running condition.

Since the vehicle 2 is completely within vehicle control block 2, it is without vehicle control block 3 and the relays in vehicle control block 3 may be reset, as shown in the drawing. The reset signal for the bistable relays in vehicle control block 3 is applied to the terminal 156a of the bistable relay 119a. From there the signal is coupled through the closed contacts 144a of bistable relay 119a, through the closed contacts 146a of the bistable relay 121a which is now in the set condition and from there to the reset coils 120c and 124c of the bistable relays 119c and 121c, respectively. The bistable relays in vehicle control block 3 are now in a condition to be once again set and to sense the presence of a vehicle in vehicle control block 3.

The relay 114a as well as the relay 119a achieve the failsafe feature of interruption of the control signal to the speed encoder 78a for preventing the generation of a vehicle speed control signal in the event that the receiver 48a no longer senses the presence of the vehicle 2 when it is within vehicle control block 2, or if the relays 114a or 119a fail in such a manner that a vehicle presence signal is no longer stored, as was explained for the forward running condition as illustrated in FIG. 3.

As the rear vehicle car 6, which is the first vehicle car of vehicle 2 to enter vehicle control block 1 does so, radio frequency receiver 48a in vehicle control block 2 no longer receives radio frequency transmissions at frequency $f2$ and the relay 116a in vehicle control block 2 therefore becomes deenergized. At substantially the same time radio frequency receiver 48b in vehicle control block 1 senses the radio frequency transmissions at frequency $f2$ and an energizing signal is applied via the line 117b to the relay 116b energizing the relay. The energizing signal in turn is applied to the set coil 122b of the bistable relay 121b setting the relay and thereby storing a first vehicle presence signal. The relay contacts 146b close and the relay contacts 148b of the relay 121b open. The opening of the relay contacts 148b opens the path for the control signal which is applied from the terminal 158b in vehicle control block 1 to the speed encoder 78a in vehicle control block 2 thereby preventing the generation of vehicle speed control signals in vehicle control block 2. The closing of the contacts 146b of the relay 121b is the first step in the closing of a path for a reset signal to be applied to the reset coils 120a and 124a of the bistable relays 119a and 121a in vehicle control block 2 as shall be explained shortly.

As the front vehicle car 4 enters vehicle control block 1 the radio frequency receiver 48a in vehicle control block 2 no longer senses the transmission of radio frequency signals at frequency $f1$ and the relay 114a in vehicle control block 2 becomes deenergized opening the relay contacts 126a. At substantially the same time radio frequency receiver 48b in vehicle control block 1 begins to receive the radio frequency transmissions at radio frequency f1 and applies an energizing signal to relay 114b by way of line 115b energizing the relay, closing relay contacts 126b. The energizing signal is also applied to the set coil 118b of the bistable relay 119b setting the relay and thereby storing a second vehicle presence signal which is indicative of the front vehicle car 4 being present in vehicle control block 1. The relay contacts 142b of bistable relay 119b open thereby blocking the flow of the control signal to vehicle control block 2 and the relay contacts 140b and 144b of the same relay close. The closure of the relay contacts 140b provides a path for the control signal from the vehicle control block 0 (not shown) through the closed contacts 140b of relay 119b through the closed contacts 126b of the relay 114b and in turn to the speed encoder 78b so that vehicle speed control signals may be generated for the vehicle 2 which is now completely within vehicle control block 1. The closure of the contacts 144b provides a path for the reset signal for the bistable relays in vehicle control block 2. The reset signal is applied to the terminal 156b of the relay 119b through the closed contacts 144b of the bistable 119b , relay through the closed contacts 146b of the bistable relay 121b, which is also in the set state, and to the reset coils 120a and 124a of the bistable relays 119a and 121a, respectively, in vehicle control block 2. The relays 119a and 121a in vehicle control block 2 are now in a condition to be once again set and to store vehicle presence signals indicative of a vehicle being in vehicle control block 2. The system for reverse running operates in a like manner as the vehicle continues from the vehicle control block 1 to vehicle control block 0 (not shown) and so on.

The showing of separate diagrams for forward and reverse running as shown in FIGS. 3 and 4, respectively, was done to simplify the drawings and it should be readily apparent to one skilled in the art how one composite relay configuration may be laid out as the same relays are used for each running conditions, the only difference being the individual contacts of the relays which are utilized and which are shown in the respective drawings.

In summary, a vehicle control and detection system has been described uses either solid state logic devices or relay devices. In response to a first device sensing the presence of a vehicle within a given vehicle control block a vehicle presence signal is stored and a vehicle speed control signal is generated for the vehicle within the given vehicle control block. In response to the first device no longer sensing the presence of the vehicle or the vehicle no longer storing the vehicle presence signal when the vehicle is within the given vehicle control block, or a vehicle is sensed in the succeeding vehicle control block, the vehicle speed control signal for the vehicle in the given vehicle control block is interrupted.

I claim:

1. In a vehicle control system wherein a vehicle travels along a vehicle travel path divided into a plurality of vehicle control blocks, and said vehicle's movement through a given vehicle control block in controlled by a provided vehicle control signal, the combination comprising:
   first means for continuously sensing the presence of said vehicle within said given vehicle control block;
   second means for storing a vehicle presence signal in response to said first means sensing the presence of said vehicle;
   third means for providing said vehicle control signal for said vehicle within said given vehicle control block in response to the sensing of the absence of another vehicle in at least the vehicle control block succeeding said given vehicle control block; and
   means responsive to either one of said first means no longer sensing the presence of said vehicle within said given vehicle control block or said second means no longer storing said vehicle presence signal, during the time said vehicle is within said given vehicle control block, for inhibiting the provision of said vehicle control signal for said vehicle within said given vehicle control block.

2. In a vehicle control system wherein a vehicle includes at least first and second vehicle cars, and said vehicle travels along a vehicle travel path divided into a plurality of vehicle control blocks, and said vehicles movement through a given vehicle control block is controlled by a provided vehicle control signal, the combination comprising:
   first means for continuously sensing the presence of said first and second vehicle cars within said given vehicle control block;
   second means for storing a first vehicle car presence signal in response to said first means sensing the presence of said first vehicle car within said given vehicle control block;
   third means for storing a second vehicle car presence signal in response to said first means sensing the presence of said second vehicle car within said given vehicle control block;
   fourth means for providing said vehicle control signal for said vehicle within said given vehicle control block in response to the sensing of the absence of another vehicle in at least the vehicle control block succeeding said given vehicle control block; and
   means responsive to any one of said first means no longer (a) sensing the presence of said first vehicle car or (b) said second vehicle car within said given vehicle control block, or (c) said second means no longer storing said first vehicle car presence signal or (d) said third means no longer storing said second vehicle car presence signal, during the time said vehicle is within said given vehicle control block, for inhibiting the provision of said vehicle control signal for said vehicle within said given vehicle control block.

3. The combination claimed in claim 2 wherein said first vehicle car transmits a signal at a frequency $f1$ and said second vehicle car transmits a signal at a frequency $f2$, which is different than said frequency $f1$; and
   said second means stores said first vehicle car presence signal in response to said first means sensing the transmission of said signal at said frequency $f1$, and said third means stores said second vehicle car presence signal in response to said first means sensing the transmission of said signal at said frequency $f2$.

4. In a vehicle control system wherein a vehicle travels along a vehicle travel path divided into a plurality of vehicle control blocks, the combination comprising:
   first means for continuously sensing the presence of said vehicle within a first vehicle control block;
   second means for storing a first vehicle presence signal in response to said sensing by said first means;
   third means in a second vehicle control block for continuously sensing the presence of a vehicle within said second vehicle control block;
   fourth means located in said second vehicle control block and responsive to said sensing by said third means for providing a second vehicle presence signal, and said second means discontinuing the storage of said first vehicle presence signal in response to the provision of said second vehicle presence signal;
   fifth means for providing a vehicle control signal for another vehicle in a third vehicle control block in response to said second means no longer storing said first vehicle presence signal; sixth means for providing a vehicle control signal for said vehicle within said first vehicle control block in response to said fourth means no longer providing said second vehicle presence signal; and
   means for inhibiting the provision of said vehicle control signal for said vehicle within said first vehicle control block in response to either one of said first means no longer sensing the presence of said vehicle within said first vehicle control block or said second means no longer storing said first vehicle presence signal during the time said vehicle is within said first vehicle control block.

5. The combination claimed in claim 4 wherein said second means comprises a first bistable element which is set to a first bistable state in response to said sensing by said first means, and which remains in said first bistable state until being set to a second bistable state in response to the sensing of the presence of said vehicle within a third vehicle control block.

6. The combination claimed in claim 5 wherein said fourth means includes a second bistable element which is set to a first bistable state in response to said sensing by said fourth means and which remains in said first bistable state until being set to a second bistable state in response to the sensing of the presence of said vehicle within a third vehicle control block.

7. In a vehicle control system wherein a vehicle includes at least first and second vehicle cars, and said vehicle travels along a vehicle travel path divided into a plurality of vehicle control blocks, the combination comprising:
   first means for continuously sensing the presence of said first and second vehicle cars within a first vehicle control block;
   second means for storing a first vehicle car presence signal in response to said first means sensing the presence of said first vehicle car within said first vehicle control block;
   third means for storing a second vehicle car presence signal in response to said first means sensing the presence of said second vehicle car within said first vehicle control block;
   fourth means in a second vehicle control block for sensing the presence of said first and second vehicle cars within said second vehicle control block;
   fifth means located in said vehicle control block and responsive to said fourth means no longer sensing the presence of said first and second vehicle cars for providing a control signal for said first vehicle control block;
   sixth means located in said first vehicle control block for generating a vehicle control signal for a vehicle within said first vehicle control block in response to said fifth means providing said control signal for said first vehicle control block; and
   means for preventing the generation of said vehicle control signal for vehicles within said first vehicle control block in response to any one of (a) said first means no longer sensing the presence of said first and second vehicle cars within said first vehicle control block or (b) said second means no longer storing said first vehicle car presence signal or (c) said third means no longer storing said second vehicle car presence signal, during the time said vehicle is within said first vehicle control block.

8. The combination claimed in claim 7 wherein said first vehicle car transmits a signal at a frequency $f1$ and said second vehicle car transmits a signal at a frequency $f2$ which is different than $f1$; and said second means stores said first vehicle car presence signal in response to said first means sensing the transmission of said signal at frequency $f1$ and said third means stores said second vehicle car presence signal in response to said first means sensing the transmission of said signal at frequency $f2$.

9. A method of controlling the movement of a vehicle along a vehicle travel path divided into a plurality of vehicle control blocks, wherein said vehicle's movement through a given vehicle control block is controlled by a provided vehicle control signal, said method comprising the steps of:
   continuously sensing the presence of said vehicle within said given vehicle control block;
   storing a vehicle presence signal in response to said sensing the presence of said vehicle within said given vehicle control block;
   providing said vehicle control signal in response to sensing the absence of a vehicle in at least the vehicle control block succeeding said given vehicle control block; and
   preventing the provision of said vehicle control signal in response to either one of no longer sensing the presence of said vehicle in said given vehicle control block or not storing said vehicle presence signal during the time said vehicle is within said given vehicle control block.

10. A method of controlling the movement of a vehicle along a vehicle travel path divided into a plurality of vehicle control blocks, and said vehicle includes at least first and second vehicle cars, with said vehicle's movement through a given vehicle control block being controlled by a provided vehicle control signal, said method comprising the steps of:
   continuously sensing the presence of said first and second vehicle cars within said given vehicle control block;
   storing first and second vehicle car presence signals in response to said sensing the presence of said first and second vehicle cars, respectively, within said given vehicle control block;
   providing said vehicle control signal in response to sensing the absence of a vehicle in the succeeding vehicle control block concurrent with continuously sensing the presence of said first and second vehicle cars within said given vehicle control block during the time the first and second vehicle cars presence signals are stored;
   discontinuing the storage of said first and second vehicle car presence signals in response to sensing the presence of said first and second vehicle cars, respectively in said succeeding vehicle control block;
   providing a vehicle control block unoccupied signal to the preceding vehicle control block in response to the discontinuance of the storage of said first and second vehicle car presence signals; and
   preventing the generation of said vehicle control signal for said given vehicle control block in response to either one of no longer sensing the presence of said first and second vehicle cars within said given vehicle control block or not storing said first and second vehicle car presence signals during the time said vehicle is within said given vehicle control block.

* * * * *